(12) United States Patent
McGarva et al.

(10) Patent No.: US 11,198,088 B2
(45) Date of Patent: Dec. 14, 2021

(54) AIR PURIFYING DEVICE

(71) Applicant: KONINKLIJKE PHILIPS N.V., Eindhoven (NL)

(72) Inventors: John Robert McGarva, Eindhoven (NL); Jun Gu, Eindhoven (NL); GuoNing Hu, Eindhoven (NL); Barry Boudewijn Goeree, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 240 days.

(21) Appl. No.: 15/763,582

(22) PCT Filed: Sep. 8, 2016

(86) PCT No.: PCT/IB2016/055343
§ 371 (c)(1),
(2) Date: Mar. 27, 2018

(87) PCT Pub. No.: WO2017/055951
PCT Pub. Date: Apr. 6, 2017

(65) Prior Publication Data
US 2018/0257018 A1   Sep. 13, 2018

(30) Foreign Application Priority Data
Sep. 30, 2015   (CN) .......................... 201520772243.7

(51) Int. Cl.
*B01D 53/02* (2006.01)
*B01D 46/00* (2006.01)
(Continued)

(52) U.S. Cl.
CPC ....... *B01D 46/0086* (2013.01); *B01D 46/009* (2013.01); *B01D 46/0019* (2013.01);
(Continued)

(58) Field of Classification Search
CPC ............ B01D 46/0019; B01D 46/0086; B01D 46/009; B01D 46/44; B01D 46/442; F24F 11/30; F24F 11/39; F24F 3/1603
See application file for complete search history.

(56) References Cited

U.S. PATENT DOCUMENTS 6,186,140 B1    2/2001  Hoague
6,703,937 B1 *  3/2004  Franz ................. B01D 46/0086
                                                       340/607
(Continued)

FOREIGN PATENT DOCUMENTS

CN    104841214 A    8/2015
CN    205174701 U    4/2016
(Continued)

*Primary Examiner* — Christopher P Jones
(74) *Attorney, Agent, or Firm* — Schott, P.C.

(57) ABSTRACT

The present utility model discloses an air-purifying apparatus. The air-purifying apparatus comprises a filter screen, filter screen type determining component, and filter screen service life determining component. The filter screen is for filtering particles and at least one of specific chemical matters in the air. The filter screen determining component is configured to determine a type of the filter screen. The filter screen service life determining component is configured to determine whether the filter screen needs to be changed according to the determined type of the filter screen and a use condition of the filter screen. With the air-purifying device of the present disclosure, remaining service lives of the filter screens of different types or specifications may be obtained, then a user may be prompted when the filter screen needs to be changed, thereby allowing the user to maintain a good air-purifying effect at any time.

22 Claims, 1 Drawing Sheet

Figure 1:
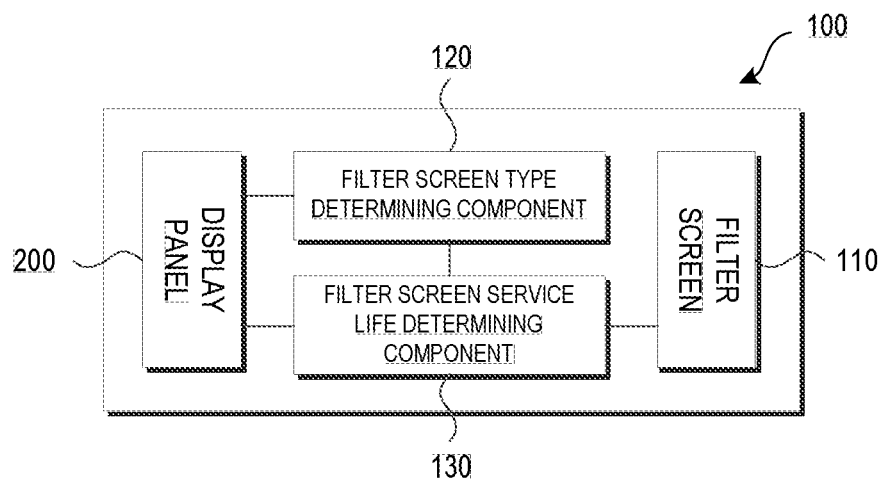

(51) Int. Cl.
*F24F 11/30* (2018.01)
*F24F 11/39* (2018.01)
*F24F 8/10* (2021.01)
*B01D 46/44* (2006.01)

(52) U.S. Cl.
CPC .............. *B01D 46/442* (2013.01); *F24F 8/10* (2021.01); *F24F 11/30* (2018.01); *F24F 11/39* (2018.01); *B01D 46/44* (2013.01)

(56) References Cited

U.S. PATENT DOCUMENTS

| | | | | |
|---|---|---|---|---|
| 2003/0076119 | A1* | 4/2003 | Horz | B01D 46/0086 324/686 |
| 2004/0112273 | A1* | 6/2004 | Thoede | B01D 46/0086 116/70 |
| 2007/0012181 | A1 | 1/2007 | Niezgoda | |
| 2010/0144262 | A1* | 6/2010 | Hofhaus | B01D 46/009 454/75 |
| 2012/0125592 | A1* | 5/2012 | Fadell | B01D 46/0086 165/201 |
| 2012/0151889 | A1* | 6/2012 | Horey | B01D 46/10 55/467 |
| 2012/0323374 | A1 | 12/2012 | Dean-Hendricks | |
| 2013/0220900 | A1* | 8/2013 | Milvert | B01D 35/143 210/85 |
| 2015/0306533 | A1* | 10/2015 | Matlin | B01D 46/448 96/420 |
| 2017/0277163 | A1 | 9/2017 | Koshi | |
| 2018/0257018 | A1 | 9/2018 | McGarva | |

FOREIGN PATENT DOCUMENTS

| | | |
|---|---|---|
| CN | 105588259 A | 5/2016 |
| JP | H03207425 | 9/1991 |
| JP | H04284807 | 10/1992 |
| JP | H10106914 | 4/1998 |
| JP | 2006145053 | 6/2006 |
| JP | 2007190506 | 8/2007 |
| WO | 2011019729 | 2/2011 |

* cited by examiner

AIR PURIFYING DEVICE

This application is the U.S. National Phase application under 35 U.S.C. § 371 of International Application No. PCT/IB2016/055343, filed on Sep. 8, 2016, which claims the benefit of International Application No. 201520772243.7 filed on Sep. 30, 2015. These applications are hereby incorporated by reference herein.

FIELD

Embodiments of the present utility model generally relate to an air-purifying device, and more specifically, to an air-purifying device capable of achieving different purifying performances by different types or specifications of filter screens.

BACKGROUND

As people become more concerned with air quality, more and more varieties of air-purifying devices are provided on the market for consumers to select. It is well known in the art that different types or specifications of filter screens may be employed for different application scenarios. For example, in a newly renovated room, it is always desired to use a filter screen in an air-purifying device that can remove formaldehyde so as to pertinently reduce formaldehyde damages to human body. Or, when the air quality in the atmosphere environment is relatively poor, a user anticipates that the air-purifying apparatus can filter more particles in the air, particularly those particular materials with a diameter below 2.5 mirons (PM2.5).

However, the existing air-purifying apparatus cannot accurately and intelligently notify when the user needs to change a filter screen, such that the filter screen cannot achieve a desired purifying effect due to already exceeding the service life or degrading of the capability of removing particular materials/chemical substances.

SUMMARY

An objective of the present disclosure lies in providing an improved air-purifying apparatus, such that it can automatically obtain a remaining service life for different types of filter screens so as to accurately tell the user when a filter screen needs to be changed and what filter screen is to be changed.

According to one aspect of the present disclosure, there is provided an air-purifying apparatus that comprises a filter screen, a filter screen type determining component, and a filter screen service life determining component. The filter screen is for filtering at least one of particles and specific chemical matters in the air. The filter screen determining component is configured to determine a type of the filter screen. The filter screen service life determining component is configured to determine whether the filter screen needs to be changed according to the determined type of the filter screen and a use condition of the filter screen.

In the present disclosure, the "type of the filter screen" corresponds to different functions of the filter screen, i.e., whether it filters particles in the air or filters specific chemical substances in the air, or what chemical substance the specific chemical substance is, etc. The "type of filter screen" may also correspond to different specifications of the filter screen, e.g., a total amount or capacity for a certain filter screen to process air, etc. The air-purifying apparatus according to the embodiments of the present disclosure can calculate use conditions of different filter screens within the air-purifying apparatus, e.g., condition of its remaining service life. Therefore, a more accurate change time for the filter screen may be obtained, such that the purifying capability of the air-purifying apparatus will not be depleted due to exceeding the service life of the filter screen, or no waste is caused due to change of the filter screen before it reaches its service life.

According to one embodiment of the present disclosure, a quantity of the filter screens may be at least two, and at least a chemical substance filter screen that can filter specific chemical substances and a particulate filter screen that can filter particulate materials are included.

According to one embodiment of the present disclosure, the air-purifying apparatus may further comprise a front filter screen. The front filter screen may be used to filter large-diameter particles or hair.

According to one embodiment of the present disclosure, use conditions of the filter screen may be selected from at least one of the following: air volume that has been filtered, the duration since it has been installed, and the amount of particles that have been collected.

According to one embodiment of the present disclosure, the air-purifying apparatus may further comprise a pollutant sensor configured to detect a level of certain pollutant particles in the air, and to determine the amount of particles that have been collected based on the detected level of the pollutant particles and an air inlet speed of the air-purifying apparatus as the pollutant particles are accumulated with time.

According to one embodiment of the present disclosure, the filter screen type determining component may be configured to determine the type of the filter screen according to a manual input from the user.

According to one embodiment of the present disclosure, the air-purifying apparatus may further comprise a tag detector, wherein the filter screen has a tag with a code detectable by the tag detector, and the filter screen type determining component is configured to determine the type of the filter screen according to the code of the tag detected by the tag detector.

According to one embodiment of the present disclosure, the tag may be a radio frequency identifier RFID tag.

According to one embodiment of the present disclosure, the air-purifying apparatus may further comprise a display panel for displaying a prompt as to whether the filter screen needs to be changed.

According to one embodiment of the present disclosure, the display panel may comprise a prompt area for displaying the prompt to a user. The prompt area may also be used to display a current air quality, e.g., PM 2.5 numerical value, etc.

According to one embodiment of the present disclosure, the display panel may comprise a filter screen type determining component configured to allow the user to manually select the type of the filter screen.

The embodiments of the present disclosure generally have the following advantages: allowing an air-purifying apparatus to obtain/calculate use conditions according to different types of filters, compare a use condition of a filter with its specifications, and then determine whether the filter needs to be changed; such change is optimal and pertinent and avoids changing of the filter too early or too late.

BRIEF DESCRIPTION OF THE ACCOMPANYING DRAWINGS

Figure 2:
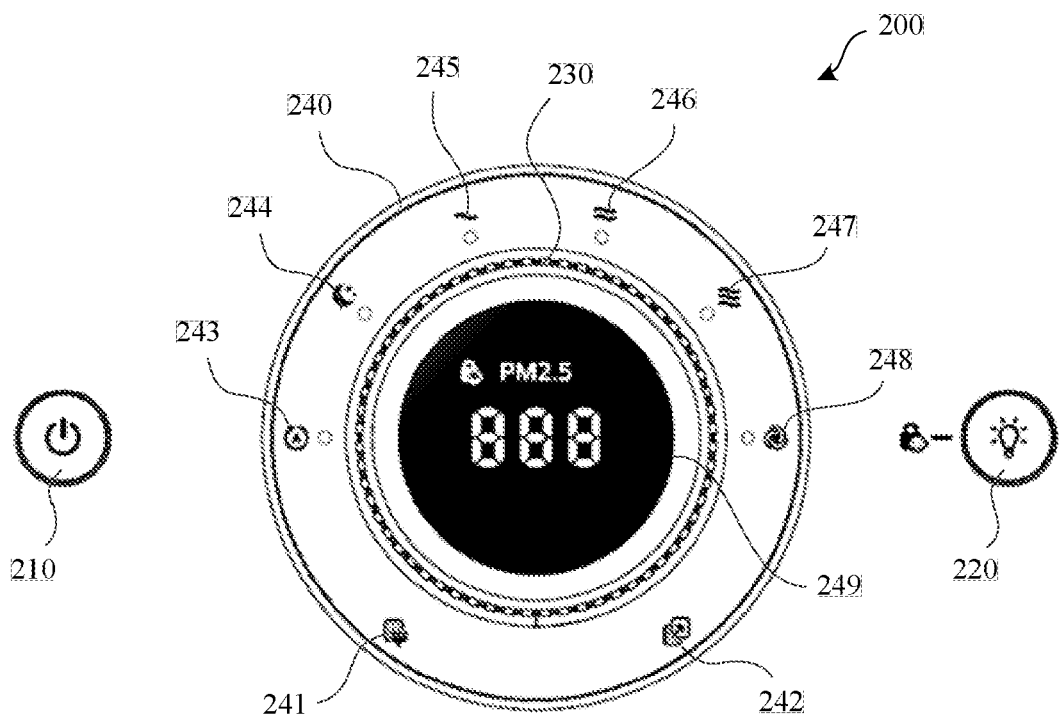

The above and other objectives, features, and advantages of the embodiments of the present disclosure will become easily comprehensible through the following detailed depiction with reference to the accompanying drawings. In the drawings, a plurality of embodiments of the present disclosure will be illustrated in an exemplary and non-limiting manner, wherein:

FIG. 1 illustrates a block diagram of an air-purifying apparatus according to the embodiments of the present disclosure; and FIG. 2 schematically illustrates a schematic diagram of a display panel of an air-purifying apparatus according to the embodiments of the present disclosure.

DETAILED DESCRIPTION OF EMBODIMENTS

Hereinafter, the principle of the present disclosure will be illustrated with reference to various exemplary embodiments illustrated in the drawings. It should be understood that depiction of these embodiments is only to enable those skilled in the art to better understand and further implement the present disclosure, not intended to limit the scope of the present disclosure in any manner. It should be noted that if feasible, similar or same reference numerals may be used in the drawings, and similar or same reference numerals may indicate similar or same functions. Those skilled in the art will become easily aware that in the depiction below, alternative embodiments of the structure and method illustrated in the present disclosure may be employed without departing from the principle of the present utility model as depicted herein.

The term "comprise" and its variants should be understood as open terms, meaning "including, but not limited to." The term "or" should be regarded as "and/or," unless otherwise explicitly indicated in the context. The term "based on" should be regarded as "at least partially based on." The term "one embodiment" and "an embodiment" should be regarded as "at least one embodiment." The term "another embodiment" should be regarded as "at least one other embodiment." Unless otherwise specified or limited, the terms "mount," "connect," "support" and "couple," as well as their variants, should be used broadly and include direct and indirect mounting, connecting, supporting, and coupling. In addition, "connect" and "couple" are not limited to physical or mechanical connection or coupling. In the depiction below, same reference numerals and annotations are used to describe same, similar or corresponding portions in a plurality of views of FIGS. 1-2. Other explicit and implicit definitions will be included hereinafter.

FIG. 1 illustrates a block diagram of an air-purifying apparatus 100 according to the embodiments of the present disclosure. An air-purifying apparatus 100 is generally used for filtering various kinds of undesired substances in the air, e.g., dusts, particles, and various kinds of hazardous chemical substances. The air-purifying apparatus 100 may include, in its housing, certain space for accommodating a filter screen 110. Because the space has certain thickness/depth, it may accommodate a plurality of different or identical filter screens 110 for different substance kinds to be filtered. Of course, the space may also only accommodate one filter screen 110.

In the present disclosure, a type of the filter screen 110 indicates its function (e.g., a kind of the substance that can be filtered, such as PM2.5 particles or formaldehyde molecules) and/or its specification (e.g., how many substances it may filter, for example, it can process air of one million cubic meters). Based on different needs of a user, different types of filter screens 110 may be disposed within the air-purifying apparatus 100. By drawing in air in room space such that it passes through the filter screen 110 and then discharges the filtered air out of the air-purifying apparatus 100, hazardous substances in the air may be pointedly filtered and removed.

For example, in a newly renovated room, wallpaper, floor and furniture and the like will generally emit a considerable amount of formaldehyde, while it is well known that formaldehyde is rather hazardous to human body. Therefore, in this environment, a user would like to use a filter screen 110 specifically effective to remove formaldehyde so as to reduce the formaldehyde concentration in indoor air. Additionally, when the outdoor air quality is very poor, e.g., in a haze weather, the user would like to use a filter screen 110 specifically effective to remove particulate materials, particularly PM2.5 (with a diameter under 2.5 microns) particulate materials so as to reduce particulate material concentration in the indoor air. The user may also use different types of filter screens 110 in the air-purifying apparatus 100 to achieve multiple purposes.

In one embodiment, the air-purifying apparatus 100 may also comprise a front filter (not shown) being disposed in the air-purifying apparatus 100 before the filter screen 110. The front filter may be used to filter larger particulate materials, e.g., particles with a diameter larger than 10 microns, substances such as hair, dust, and cotton fiber. The filter screen 110 may have tags, and the user may determine the type of the filter screen based on the information on the tag. In one embodiment, the information/code on the tag may be read by the air-purifying apparatus 100. This example will be illustrated in the following.

The filter screen 110 may have a tag, and the user may determine type of the filter screen type determining component 120 which may be used to determine the type of the filter screen 110 mounted in the air-purifying apparatus 100. In one example, the filter screen type determining component 120 receives a user instruction to determine a type of the filter screen 110. In another example, the filter screen type determining component 120 receives a signal from a tag detector (not shown) to determine the type of the filter screen 110. The tag detector can be used to detect or scan the information/code of the tag on the filter screen 110, and determine the type of the filter screen 110 according to the obtained information/code transmitted as a signal. In one example, the tag on the filter screen 110 may be an RFID tag and the tag detector is an RFID scanner.

The air-purifying apparatus 100 according to the embodiments of the present disclosure further comprises a filter screen service life determining component 130 that determines whether the filter screen 110 needs to be changed according to the type of the filter screen 110 as determined by the filter screen type determining component 120 and the user condition of the filter screen 110. In one example, the user condition of the filter screen 110 may be selected from at least one of the following items: (1) air volume that has been filtered; (2) duration after installation, and (3) amount of particles that have been collected. For the filter screen 110 for particles, its use condition may be determined according to parameters (1), (2), and (3); its design service life is determined by its specifications, e.g., as shown in Table 1 below:

TABLE 1

| Filter screen code | Designed maximum value of the filtered air volume | Designed maximum value of the amount of collected particles | Designed maximum value for the duration after installation |
| --- | --- | --- | --- |
| H1 | 250,000 m$^3$ | 5,000 mg | 24 months |
| H2 | 500,000 m$^3$ | 10,000 mg | 24 months |
| H3 | 1,000,000 m$^3$ | 20,000 mg | 24 months |
| H4 | 1,500,000 m$^3$ | 30,000 mg | 24 months |
| H5 | 2,000,000 m$^3$ | 40,000 mg | 24 months |
| H6 | 2,500,000 m$^3$ | 50,000 mg | 24 months |

Table 1 above illustrates a designed service life corresponding to filter screens 110 of various codes. H1-H6 represent the codes of the filter screen 110. H denotes that the filter screen 110 is for filtering particulate materials in the air, while digits 1 to 6 refer to the designed allowed filter amount of the filter screen 110. The designed maximum value of the filtered air volume corresponds to (1) the filtered air volume mentioned above; the designed maximum value of the amount of collected particles corresponds to (3) amount of collected particles mentioned above; and the designed maximum value of the duration after installation corresponds to (2) duration after installation as mentioned above.

It should be understood that different types of filter screens may be classified using any encoding logic, e.g., besides C and H, any letters or symbols may denote the function of the filter screen; reversed numbers and any symbols besides numbers may be used to represent the specification of the filter screen.

In one embodiment, when the use condition of the filter screen 110, e.g., any one of the three parameters (1)-(3), reaches the designed maximum value in Table 1, it indicates that the filter capacity and performance of the filter screen 110 have degraded to an unideal state; therefore, it is required to be changed. However, in other embodiments, it is also allowable to indicate that the filter screen 110 needs to be changed when at least two of the three parameters reach the designed maximum values in Table 1.

The three parameters (1)-(3) may be derived from the following calculations in one example. For (1) the volume of the filtered air, it equals to a flow rate of intake air (in a unit of for example m$^3$ per hour) multiplied with total time (in a unit of for example hour) of motor running; for (2) duration after installation, it equals to the time totally elapsing after a filter screen is installed, regardless of whether the air-purifying apparatus 100 is powered or running; and for (3) the amount of collected particles equals to a value of PM2.5 (in a unit of for example mg/m$^3$) multiplied with a flow rate (in a unit of for example m$^3$ per hour) multiplied with a total time of motor running (in a unit of for example hour), i.e., equal to the value of PM2.5 (in a unit of for example mg/m$^3$) multiplied with the volume of filtered air (in a unit of m$^3$). The flow rate of intake air may be derived through a sensor (not shown) in the air-purifying apparatus 100 or indirectly derived through a rotational speed of the motor.

Although the embodiment above schematically illustrates determining use condition of the filter screen based on the value of PM2.5, the use condition of the filter screen may also be determined for other particulate materials. For example, the air-purifying apparatus 100 may comprise various kinds of sensors to detect a level of a specified pollutant particle in the air, and obtains a removal rate of the pollutant particle according to preset correspondence relationships of the removal rate of the pollutant corresponding to different air intake speeds in the air-purifying apparatus 100. Finally, with the elapse of time, the use condition of the filter screen is calculated. According to this manner, the air-purifying apparatus 100 may be configured to detect and purify various kinds of pollutant particles.

For the filter screen 110 for a specific chemical substance, its use condition may be determined according to parameters (1) and (2), and its designed service life is determined by its specification, e.g., as illustrated in Table 2 below:

TABLE 2

| Code of the filter screen | Designed maximum value of the volume of filtered air | Designed maximum value of the duration after installation |
| --- | --- | --- |
| C1 | 250,000 m$^3$ | 24 months |
| C2 | 500,000 m$^3$ | 24 months |
| C3 | 1,000,000 m$^3$ | 24 months |
| C4 | 1,500,000 m$^3$ | 24 months |
| C5 | 2,000,000 m$^3$ | 24 months |
| C6 | 2,500,000 m$^3$ | 24 months |

Table 2 above illustrates designed service lives corresponding to filter screens 110 of various codes. C1 to C6 represent codes of the filter screen 110. C indicates that the filter 110 is for filtering a certain chemical substance in the air, e.g., formaldehyde, while numbers 1 to 6 indicate the designed allowed amount to filter by the filter 110. The designed maximum value of the filtered air volume corresponds to (1) the filtered air volume mentioned above; and the designed maximum value of the duration after installation corresponds to (2) duration after installation as mentioned above. It should be understood that a filter screen 110 for other chemical substance may also be introduced, and other sub-titles or other symbols besides C and H are used as their codes.

In one embodiment, when a use condition of the filter screen 110, e.g., any one of the two parameters (1) and (2) as mentioned above, reaches a designed maximum value in Table 2, it indicates that the filter capacity and performance of the filter screen 110 have degraded to an unideal state and therefore the filter screen 110 needs to be changed. However, in other embodiments, it is also allowed to indicate that the filter screen 110 needs to be changed when both of the two parameters reach the designed maximum values in Table 1.

The two parameters (1) and (2) may be obtained according to the calculation manners mentioned above, which are therefore not detailed here.

In other embodiments, other parameters may also be used to determine use conditions of the filter screen, e.g., accumulated time of motor running after a certain filter screen is installed. These other parameters may be used to determine the user conditions of the filter screen in a manner similar to the embodiments above; therefore, they are also included within the protection scope of the present disclosure.

In one embodiment, with reference to FIG. 1, the air-purifying apparatus 100 may further comprise a display panel 200 for displaying a prompt of whether the filter screen 110 needs to be changed. Specifically, the display panel 200 may receive the determined type of the filter screen 110 transmitted by the filter screen type determining component 120, and may also receive a prompt signal of whether the filter screen 110 needs to be changed by the filter screen service life determining component 130. The display panel 200 may also comprise a user interface such that the user may interact with the air-purifying apparatus 100 so as to set operations of the latter. The interaction procedure will be illustrated in detail with reference to FIG. 2 in the following.

FIG. 2 schematically illustrates a schematic diagram of a display panel 200 of an air-purifying device 100 according to the embodiments of the present disclosure.

In one embodiment, the display panel 200 may comprise a prompt area 240 used for displaying various kinds of prompt information to the user. Some examples of the prompt area will be provided below to illustrate, not limit, the present disclosure. A central region 249 may be used to display a type of the filter screen 110 to be changed, air quality data (e.g., current value of PM2.5), and a lock state, etc. The front filter screen alarm icon 241 may be used to emit light so as to alarm the user that the front filter screen needs to be changed. The filter screen alarm icon 242 may be used to emit light to alarm that the user needs to change at least one filter screen 110, while the type of the filter screen 110 that needs to be changed may be displayed from the central area 249. Air intake flow rate indications 244-248 may be used for emitting light, respectively, so as to indicate the air intake flow rate of the running air-purifying apparatus 100, while the air intake flow rate is directly associated with the filter capacity. In this specific example, the air intake flow rate gradually increases from 244 to 248. The automatic mode indication 243 may be used to emit light to indicate that the air intake flow rate of the air-purifying apparatus 100 is in a state of automatic adjustment, while the automatically adjusted air intake flow rate, for example, may be determined according to the current air quality date and then automatically set.

In one embodiment, the display panel 200 may also comprise the aforesaid filter screen type determining component 120 configured for the user to manually select the type of the filter screen 110. In the example illustrated in FIG. 2, the filter screen type determining module 120 may comprise a switch button 210, a lighting button 220, and a rotary knob 230. In scene A, the user can change the corresponding filter screen 110 according to the front filter screen alarm icon 241 and a filter screen alarm icon 242. Or, in scene B, the user may autonomously compulsorily change the desired filter screen 110 before obtaining these alarms. Besides, in scene C, the user may take out a filter screen at any time and change a new filter screen of a different type. All of the operations above may set a newly added filter screen via the display panel 200 (specifically, via a switching button 210, a lighting button 220, and a rotary knob 230), so as to initialize calculation of the use conditions and service life of the newly added filter screen. Hereinafter, the operation procedure of these settings will be explained in detail.

For scene A, when the air-purifying apparatus 100 works normally, the central region 249 may display a numerical value of PM2.5, while when the filter screen service life determining component 130 determines that a certain filter screen needs to be changed, the central region 249 may stop displaying the numerical value, but only displays the type of the filter screen 110 that needs to be changed. If it is the front filter screen that needs to be changed, the front filter screen alarm icon 241 flashes or constantly lights; meanwhile, the central region 249 may display "PRE" to notify the user that the front filter screen needs to be changed. If it is the filter screen 110 that needs to be changed, the filter screen alarm icon 242 flashes or constantly lights; meanwhile the central region 249 may display a type corresponding to the filter screen 110 (e.g., any one of C1-C6 and H1-H6 according to the above embodiments). If more than one filter screen 110 needs to be changed, the filter screen alarm icon 242 flashes or constantly lights; meanwhile the central region 249 may alternately display types corresponding to these filter screens 110. After the user manually changes the filter screen 110, pressing the switch button 210 for a certain time (e.g., 3 seconds), it indicates completion of the change; then the filter screen service life determining component 130 of the air-purifying apparatus 100 starts recalculation of the use condition of the newly changed filter screen 110. Moreover, the front filter screen alarm icon 241 or the filter screen alarm icon 242 stops flashing or constantly lighting, the central region 249 resumes displaying of information such as the numerical value of PM2.5.

For scene B, when the air-purifying apparatus 100 works normally, the central region 249 may display the numerical value of PM2.5. When the user would like to compulsorily change a certain filter screen (even the use condition of the filter screen is still within the designed service life), the switch button 210 and the lighting button 220 may be simultaneously pressed for a certain time (e.g., 3 seconds). The central region 249 then stops displaying information such as the value of PM2.5 and the like, but only displays the type of the filter screen 110. The user may select an installed filter screen 110 using the rotary knob 230, and selects which filter screen he/she would like to change according to the type. After the user manually changes the filter screen 110, the switch button 210 may be pressed for a certain time (e.g., 3 seconds), it indicates completion of the changing; then the user may continuously select to change another filter screen or return to the normal working mode through the rotary knob 230. If it is desired to change another filter screen, the procedure above may be repeated. If it is desired to return to the normal operation mode, the switch button 210 and the lighting button 220 may be simultaneously pressed again for a certain time (e.g., 3 seconds), the filter screen service life determining component 130 of the air-purifying apparatus 100 starts recalculation of the use conditions of the newly changed filter screen 110. Moreover, the central region 249 resumes displaying of information such as PM2.5 value.

For Scene C, when the air cleaning device 100 works normally, the central region 249 may display the PM2.5 value. When the user would like to change a certain filter screen and changes a new filter screen of a different type, the switch button 210 and the lighting button 220 may be simultaneously pressed for a certain time (e.g., 3 seconds). The central region 249 then stops displaying information such as PM2.5 value, but only displays the type of the filter screen 110. The user may select an installed filter screen 110 with the rotary knob 230 and selects which filter screen he/she desired to change according to its type. When the central region 249 is displaying a current type of the filter screen whose type is desired to change by the user, the lighting button 220 may be pressed shortly. Afterwards, the user may select a type of a new filter screen desired to change (including an empty set, i.e., only removing the filter screen without changing anew filter screen) by rotating the rotary knob 230, and then shortly presses simultaneously the switch button 210 and the lighting button 220 again for a certain time (e.g., 3 seconds), and further the filter screen service life determining component 130 of the air cleaning device 100 recalculates the use condition of the newly changed filter screen 110. Moreover, the central region 249 resumes displaying information such as the PM2.5 value.

The display panel 200 may additionally include some other operations, e.g., may shortly press the lighting button 220 to light the central region 249, press the lighting button 220 for certain time (e.g., 3 seconds) to activate the locking mode; in this mode, it is invalid to press the switch button 210, rotary knob 230, and press the lighting button 220 shortly; and the user can only unlock the locked mode by pressing the lighting button 220 again for a certain time (e.g., 3 seconds). Upon activation of the locking mode, the central region 249 may have a corresponding icon lighted to indicate that it is now in a locked mode. Besides, the display panel 200 may additionally have a light emitting portion that can change color of the emitted light according to the detected air quality so as to intuitively indicate a current indoor air quality.

It should be understood that the above illustration of various features and functions of the display panel 200 is only exemplary, not limitative. Within the spirit and scope of the present disclosure, it is also possible to make a corresponding adjustment to various features of the display panel 200.

The air-purifying apparatus according to the embodiments of the present disclosure can obtain/calculate use conditions of different types of filters, respectively, compare a use condition of a filter with its specification, and then determine whether the filter is to be changed. Such a change is preferable and more targeted; besides it avoids changing the filter too early or too late. Besides, by introducing various operations on the display panel, the filter screen may be changed intuitively and quickly, regardless of changing a new filter screen of a same type or changing a new filter screen of a different type.

According to another aspect of the present disclosure, there is provided a control panel for an air-purifying apparatus, the air-purifying apparatus comprising at least one filter screen and capable of displaying alarm information through the control panel when the filter screen needs to be changed according to a type and use condition of the filter screen, the control panel comprising: a display area that can display types of all filter screens in the air-purifying apparatus and current detected air quality; and an input area via which a user may initialize use condition of the filter screen and/or select a type of the filter screen.

According to one embodiment, when the air-purifying apparatus detects that the filter screen needs to change, the display area displays a type of the filter screen that needs to be changed.

According to one embodiment, the input area comprises a switch area, where the air-purifying apparatus can be started or closed by pressing the switch area with a duration shorter than a first predetermined time length, while when at least one filter screen thereof is detected to need changing, a type of the filter screen that needs changing is displayed through the display area, and by pressing the switch area to the first predetermined time length, use condition of the filter screen of this type being displayed in the display area can be initialized.

According to one embodiment, the input area further comprises a lighting area, where lighting of the display area can be turned on or off by pressing the lighting area with a duration less than a second predetermined time length, while the input area may be disabled by pressing the lighting area to the second predetermined time length, till the user presses again the lighting area to the predetermined time length.

According to one embodiment, the input area further comprises a rotary knob, where after simultaneously pressing the switch area and the lighting area to a third predetermined time length, a filter screen that needs changing in the air-purifying apparatus can be selected by the rotary knob, while by pressing the switching area to the first predetermined time length, use condition of the filter screen of the type being displayed in the display area can be initialized.

According to one embodiment, by simultaneously pressing the switching area and the lighting area to the third predetermined time length and after a filter screen that needs changing in the air-purifying apparatus is selected, the type of the filter screen of the type being displayed in the display area is changed through the rotary knob can be changed by pressing the lighting area with a duration smaller than the second predetermined time length.

Although the claims have been formulated for specific combinations of the features in the present application, it should be understood that the scope of the present disclosure further includes any explicit or implicit novel features or any generalization thereof, or any novel combination of the features, regardless of whether it involves a same solution in any claim as currently claimed. Applicant thereby informs that new claims may be formulated as such features and/or a combination of such features during prosecution of the present application or any further application derived therefrom.

The invention claimed is:

1. An air-purifying apparatus, wherein the air-purifying apparatus comprises:
   input means configured to receive a user instruction,
   a single motor,
   at least two filter screens,
   a filter screen type determining component configured to determine a respective type of each of the at least two filter screens, wherein each determined type of the at least two filter screens corresponds to different functions of the at least two filter screens; and
   a filter screen service life determining component configured to determine whether at least one of the at least two filter screens need to be changed according to both the determined type of the at least two filter screens and a calculated use condition of the at least two filter screens,
   the filter screen service life determining component comprising at least one processor configured to calculate the use condition of the at least two filter screens by:
      calculating a first parameter corresponding to an air volume that has been filtered;
      calculating a second parameter corresponding to an amount of particles that have been collected over time;
      calculating a third parameter corresponding to a time duration that has elapsed since at least one of the at least two filter screens has been installed; and
      monitoring the first, second and third parameters for each of the at least two filter screens to determine when a respective filter screen from among the at least two filter screens need to be changed based on at least one of the three monitored parameters reaching a designed maximum value.

2. The air-purifying apparatus according to claim 1, wherein at least one of the at least two filter screens includes at least a chemical substance filter screen capable of filtering specific chemical substances.

3. The air-purifying apparatus according to claim 1, wherein the air-purifying apparatus further comprises a display panel including a prompt area configured to display a prompt as to whether at least one of the at least two filter screens needs to be changed and further configured to display a current air quality.

4. The air-purifying apparatus according to claim 3, wherein the prompt area of the display panel is configured to display a type of filter screen to be changed, an air quality data, and a lock state.

5. The air-purifying apparatus of claim 1, further comprising a tag detector comprising an RFID scanner, wherein each of the at least two filter screens has an RFID tag with a code detectable by the tag detector, and wherein the filter screen type determining component is configured to determine the type of each of the at least two filter screens according to the code detected by the tag detector.

6. An air-purifying apparatus, wherein the air-purifying apparatus comprises:
   input means for receiving a user instruction;
   a single motor;
   a filter screen for filtering at least one of particles and specific chemical matters in the air;
   a filter screen type determining component configured to determine a type of the filter screen based on one of the user instruction or a tag detector; and
   a filter screen service life determining component comprising at least one processor arranged to determine whether the filter screen needs to be changed according to both the determined type of the filter screen and a calculated use condition of the filter screen;
   wherein the filter screen includes a tag with a code detectable by the tag detector and the filter screen type determining component is configured to optionally determine the type of filter screen according to the code of the tag detected by the tag detector, and
   wherein the processor calculates the use condition of the filter screen by calculating:
      a first parameter corresponding to an air volume that has been filtered;
      a second parameter corresponding to an amount of particles that have been collected over time; and
      a third parameter corresponding to a time duration that has elapsed since the filter screen has been installed;
   the processor further being arranged to monitor the first, second and third parameters to determine that the filter screen needs to be changed when at least one of the three monitored parameters reaches a designed maximum value.

7. The air-purifying apparatus according to claim 6, wherein the filter screen type determining component is configured to determine the type of the filter screen according to the user instruction received by the input means.

8. The air-purifying apparatus according to claim 6, wherein the air-purifying apparatus further comprises a display panel that allows a user to manually select the type of filter screen, and wherein the display panel comprises a prompt information area including a central region for displaying a type of filter screen to be changed, a current air quality data, and a lock state.

9. An air-purifying apparatus, wherein the air-purifying apparatus comprises:
   input means for receiving a user instruction;
   a single motor;
   a filter screen for filtering at least one of particles and specific chemical matters in the air;
   a filter screen type determining component configured to determine a type of the filter screen; and
   a filter screen service life determining component configured to determine whether the filter screen needs to be changed according to both the determined type of the filter screen and a calculated use condition of the filter screen,
   wherein the filter screen service life determining component comprising at least one processor configured to calculate the use condition of the filter screen by:
      calculating a first parameter corresponding to an air volume that has been filtered;
      calculating a second parameter corresponding to a time duration that has elapsed since the filter screen has been installed; and
      monitoring the first and second parameters to determine when the filter screen needs to be changed when at least one of the first and second monitored parameters reaches a designed maximum value.

10. The air-purifying apparatus according to claim 1, wherein the air volume that has been filtered is calculated as a flow rate of intake air in $m^3$ per hour multiplied with total time of the single motor running.

11. The air-purifying apparatus according to claim 1, wherein a time duration since each of the at least two filter screens have been installed is calculated as respective total elapsed times after installation irrespective of an operational state of the air-purifying apparatus.

12. The air-purifying apparatus according to claim 1, wherein a respective use condition of each of the at least two filter screens is determined based on a respective accumulated time of the single motor running for each of the at least two filter screens after installation.

13. The air-purifying apparatus according to claim 6, further comprising a pollutant sensor configured to detect a level of certain pollutant particles in the air and to determine the amount of particles that have been collected based on the detected level of the pollutant particles and an air inlet speed of the air-purifying apparatus as the pollutant particles are accumulated over time, wherein the amount of particles that have been collected is calculated as a particle value in a unit of $mg/m^3$, multiplied with a flow rate in a unit of $m^3$ per hour multiplied with a total time of the single motor running in a unit of hours.

14. The air-purifying apparatus according to claim 9, further comprising a pollutant sensor configured to detect a level of certain pollutant particles in the air and to determine the amount of particles that have been collected based on the detected level of the pollutant particles and an air inlet speed of the air-purifying apparatus as the pollutant particles are accumulated over time, wherein the amount of particles that have been collected is calculated as a particle value in a unit of $mg/m^3$, multiplied with a flow rate in a unit of $m^3$ per hour multiplied with a total time of the single motor running in a unit of hours.

15. The air-purifying apparatus according to claim 1, further comprising a display panel component, wherein the display panel component receives data corresponding to the determined type of the at least two filter screens transmitted by the filter screen type determining component for each of the at least two filter screens and further receives a prompt signal from the filter screen service life determining component when each of the at least two filter screens need to be changed.

16. The air-purifying apparatus according to claim 1, wherein at least one of the at least two filter screens includes at least a particulate filter screen capable of filtering particulate materials.

17. The air-purifying apparatus according to claim 1, further comprising a front filter screen positioned in front of the at least two filter screens, the front filter screen being configured to filter larger particulate materials with a diameter larger than 10 microns.

18. The air-purifying apparatus according to claim 1, wherein the different functions of the at least two filter screens include at least one of a kind of substance that can be filtered and a manufacturer specification of the at least two filter screens.

19. The air-purifying apparatus according to claim 1, further comprising a pollutant sensor configured to detect a level of certain pollutant particles in the air.

20. The air-purifying apparatus according to claim 1, further comprising a pollutant sensor configured to determine the amount of particles that have been collected based on the detected level of the pollutant particles and an air inlet speed of the air-purifying apparatus as the pollutant particles are accumulated over time, wherein the amount of particles that have been collected is calculated as a particle value in a unit of $mg/m^3$, multiplied with a flow rate in a unit of $m^3$ per hour multiplied with a total time of the single motor running in a unit of hours.

21. The air-purifying apparatus according to claim 9, further comprising a tag detector, wherein the filter screen has a tag with a code detectable by the tag detector; and wherein the filter screen type determining component is configured to determine the type of filter screen according to the code of the tag detected by the tag detector.

22. The air-purifying apparatus according to claim 9, further comprising a display panel configured to display a prompt regarding whether the filter screen needs to be changed and further configured to receive the determined type of filter screen transmitted by the filter screen type determining component and further configured to receive a prompt signal from the filter screen service life determining component regarding whether the filter screen needs to be changed.

\* \* \* \* \*